United States Patent
Agnew et al.

(10) Patent No.: US 9,656,667 B2
(45) Date of Patent: May 23, 2017

(54) METHOD FOR MINIMIZING AUTOMATIC BRAKING INTRUSION BASED ON COLLISION CONFIDENCE

(71) Applicant: Continental Automotive Systems, Inc., Auburn Hills, MI (US)

(72) Inventors: David Leslie Agnew, Clarkston, MI (US); Graham Lanier Fletcher, North Augusta, SC (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 40 days.

(21) Appl. No.: 14/603,490

(22) Filed: Jan. 23, 2015

(65) Prior Publication Data

US 2015/0210280 A1    Jul. 30, 2015

Related U.S. Application Data

(60) Provisional application No. 61/933,083, filed on Jan. 29, 2014.

(51) Int. Cl.
| | |
|---|---|
| *B60W 30/095* | (2012.01) |
| *B60W 30/09* | (2012.01) |
| *B60T 7/22* | (2006.01) |
| *B60T 8/171* | (2006.01) |
| *B60W 10/20* | (2006.01) |
| *B60W 10/192* | (2012.01) |
| *B60W 30/18* | (2012.01) |

(52) U.S. Cl.
CPC ............... *B60W 30/09* (2013.01); *B60T 7/22* (2013.01); *B60T 8/171* (2013.01); *B60W 10/192* (2013.01); *B60W 10/20* (2013.01); *B60W 30/095* (2013.01); *B60W 30/0953* (2013.01); *B60W 30/0956* (2013.01); *B60W 30/18036* (2013.01);

(Continued)

(58) Field of Classification Search
CPC .. B60W 30/09; B60W 30/0956; B60W 10/20; B60W 10/192; B60W 30/095; B60W 30/18036; B60W 30/0953; B60W 2550/10; B60W 2720/103; B60W 2720/106;

(Continued)

(56) References Cited

U.S. PATENT DOCUMENTS

| | | | |
|---|---|---|---|
| 5,864,285 A | 1/1999 | Wieder et al. | |
| 6,480,144 B1 * | 11/2002 | Miller | B60R 21/013 180/167 |

(Continued)

FOREIGN PATENT DOCUMENTS

| | | |
|---|---|---|
| EP | 0941903 A2 | 9/1999 |
| JP | 2008308036 A | 12/2008 |

(Continued)

OTHER PUBLICATIONS 15152998.9—EP Search Report, Jun. 18, 2015.
English translation of Japanese Office Action mailed on Jan. 5, 2016.

*Primary Examiner* — Stephen Holwerda

(57) ABSTRACT

An automatic braking system for a vehicle includes an electronic brake system capable of applying wheel brakes to decelerate the vehicle and a controller. The controller includes instructions for detecting an object proximate to a vehicle with at least one sensor for a reverse collision avoidance system and determining a collision confidence value based upon the probability of collision with the object. The controller further includes instructions for determining a desired velocity profile of the vehicle that provides for deceleration of the vehicle.

28 Claims, 5 Drawing Sheets

(52) U.S. Cl.
CPC .... *B60T 2201/022* (2013.01); *B60W 2550/10* (2013.01); *B60W 2720/103* (2013.01); *B60W 2720/106* (2013.01)

(58) Field of Classification Search
CPC ....... B60W 30/08; B60W 30/085; B60T 7/22; B60T 8/171; B60T 2201/022; B60T 2201/024
See application file for complete search history.

(56) References Cited

U.S. PATENT DOCUMENTS

| | | | |
|---|---|---|---|
| 6,856,906 B2* | 2/2005 | Winner | B60K 31/0008 340/436 |
| 2002/0017412 A1 | 2/2002 | Pietsch et al. | |
| 2003/0111902 A1 | 6/2003 | Thiede et al. | |
| 2003/0132666 A1* | 7/2003 | Bond, III | B60T 7/22 303/193 |
| 2006/0173621 A1* | 8/2006 | Stopczynski | B60W 30/09 701/301 |
| 2008/0167781 A1* | 7/2008 | Labuhn | B60W 30/08 701/48 |
| 2009/0326774 A1 | 12/2009 | Wang | |

FOREIGN PATENT DOCUMENTS

| | | |
|---|---|---|
| JP | 2011227582 A | 11/2011 |
| JP | 2012144158 A | 8/2012 |
| WO | 2012095715 A2 | 7/2012 |

\* cited by examiner

METHOD FOR MINIMIZING AUTOMATIC BRAKING INTRUSION BASED ON COLLISION CONFIDENCE

CROSS REFERENCE TO RELATED APPLICATION

This application claims priority to U.S. Provisional Application No. 61/933,083 filed on Jan. 29, 2014.

TECHNICAL FIELD

The present disclosure relates to automotive vehicles, and more particularly to driver assistance systems for automotive vehicles.

BACKGROUND

Advancements in sensor technology have led to the ability to improve safety systems for vehicles. Arrangements and methods for detecting and avoiding collisions are becoming available. Such driver assistance systems use sensors located on the vehicle to detect an oncoming collision. The systems may warn the driver of various driving situations to prevent or minimize collisions. Additionally, sensors and cameras are also used to alert the driver of possible obstacles when the vehicle is traveling in reverse. Such systems are especially useful for increasing safety in vehicles which operate under autonomous or semi-autonomous conditions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A disclosed automatic braking system for a vehicle includes, among other possible things, an electronic brake system capable of applying wheel brakes to decelerate the vehicle and a controller. The controller includes instructions for monitoring vehicle motion and detecting an object proximate to a vehicle with at least one sensor of a reverse collision avoidance system. The controller further includes instructions for determining a collision confidence value based upon the probability of a collision between the vehicle and the object. The controller further includes instructions for determining a desired velocity profile for decelerating the vehicle to stop the vehicle prior to collision with the obstacle.

A disclosed method of controlling deceleration of a vehicle includes, among other possible things, detecting and monitoring an object proximate to a vehicle with at least one sensor, monitoring motion of the vehicle and calculating continuously a collision confidence value indicative of a probability of a collision between the vehicle and the object with a controller located within the vehicle. The controller includes instructions for determining a velocity profile of the vehicle that avoids a collision between the vehicle and the object with the controller based on the collision confidence value.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The present disclosure will become more fully understood from the detailed description and the accompanying drawings, wherein.

DETAILED DESCRIPTION

Figure 1:
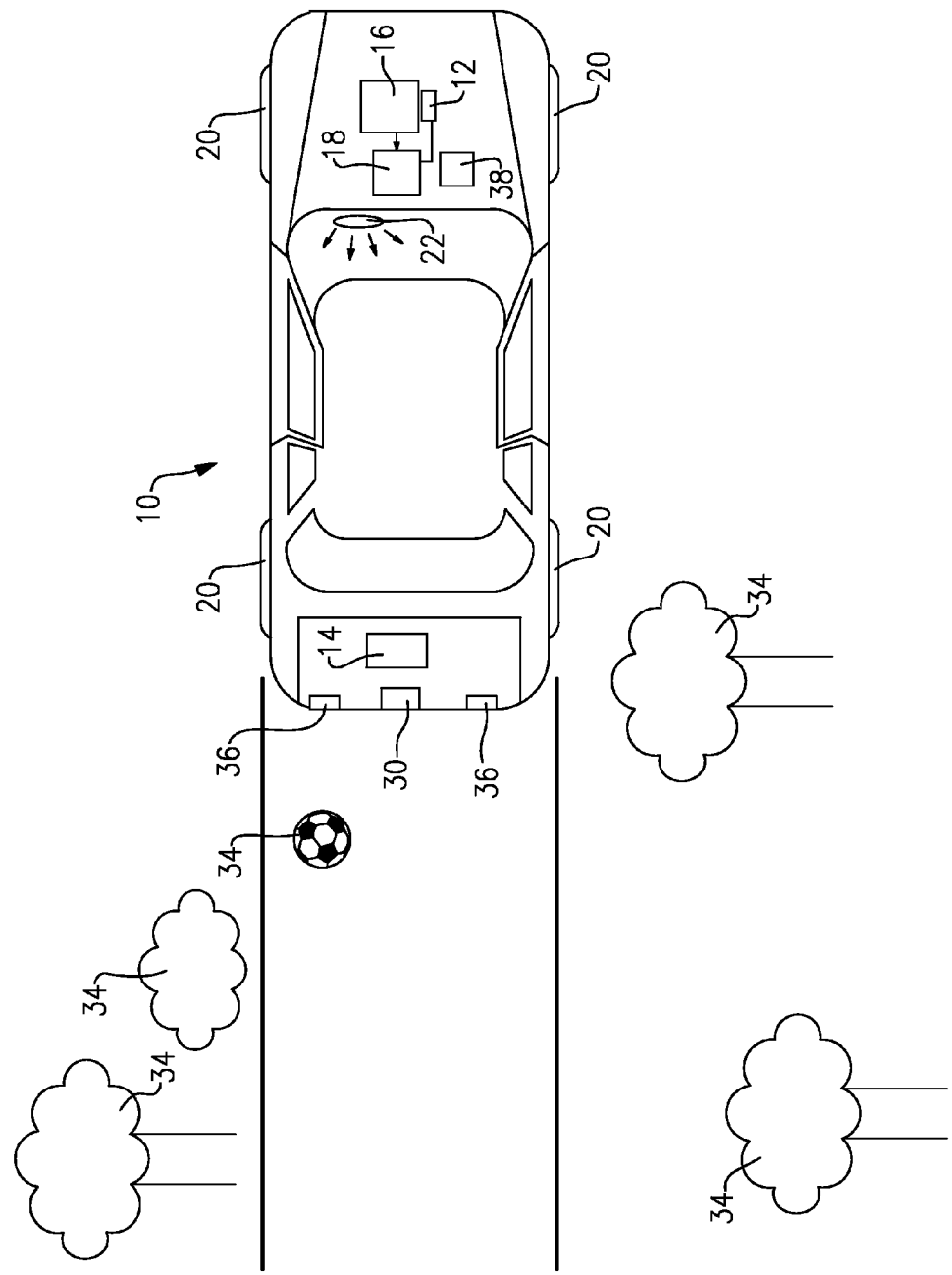
FIG. 1 is a schematic illustration of a top view of a vehicle utilizing a disclosed automatic braking system.

The following description is merely exemplary in nature and is in not intended to limit the disclosure, its application, or uses. For purposes of clarity, the same reference numbers will be used in the drawings to identify similar elements.

Referring to FIG. 1, a vehicle 10 including a driver assistance system, in particular an automatic braking system 12 is schematically shown. The automatic braking system 12 may be used to brake the vehicle 10 during autonomous and semi-autonomous vehicle operations. In particular, the automatic braking system 12 may be used when the vehicle 10 is performing a reverse driving operation. Throughout this specification the relative forward and reverse directions are in reference to the direction in which an operator for the vehicle 10 would primarily be facing when operating the vehicle 10.

The automatic braking system 12 may be used along with other safety systems, such as reverse collision avoidance system 14 and an electronic brake system (EBS) 16. A common or separate controller 18 may be used by the systems 12, 14 and 16.

The automatic braking system 12 determines when a braking event needs to occur, whether the vehicle 10 is travelling in a forward or a reverse direction. The automatic braking system 12, the reverse collision avoidance system 14, or a similar system determines a probability of collision when an object 34 is detected. The probability of collision is used to determine a collision confidence value. The more likely a collision with the object 34 the higher the collision confidence value. If the probability of collision exceeds a predetermined threshold, the controller 18 indicates that at least one vehicle collision avoidance action is required. The required action can be in the form of a warning to a driver when an object is detected and/or the automatic braking system 12 may be actuated to slow or stop the vehicle. A warning device 22 can be installed within the vehicle 10 and include a signal such as a light that is illuminated or an audible signal that alerts the driver to the presence of an object 34.

Figure 2:
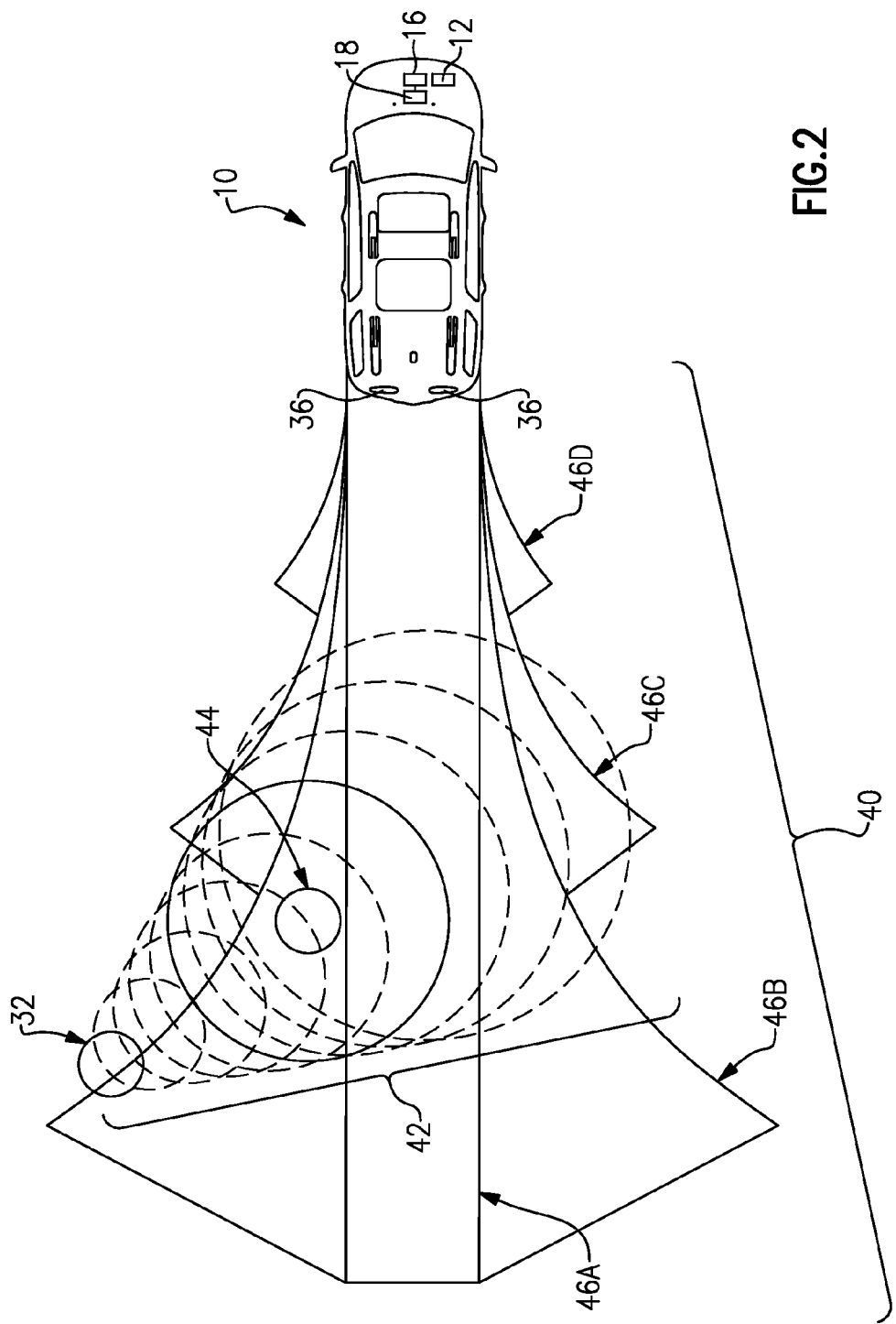
FIG. 2 is a schematic illustration of possible object and vehicle paths generated by the example automatic braking system.

Referring to FIG. 2 with continued reference to FIG. 1, the example automatic braking system 12 includes an algorithm for minimizing intrusion on driver operation under ordinary circumstances. Accordingly, the example braking system 12 minimizes the level of automatic braking actions taken that override and/or supplement driver braking operations.

The example disclosed algorithm performs a probabilistic analysis of sensor-reported objects including fixed objects and moving pedestrians, expected and/or possible motion of a detected pedestrian, and expected and/or possible driver input. Current vehicle path and potential driver input is utilized to predict a range of potential vehicle paths. If a predicted vehicle path and predicted pedestrian path (or a static object's position) intersects then a potential collision is indicated. Of all of the potential collisions that are detected, one will require intervention before the others, and that one will be acted upon.

The probabilistic analysis includes generating a predictive model of possible vehicle paths 40 and a predictive model of possible object paths 42. The possible vehicle paths 40 include the possibility that the vehicle may continue along its current path as is shown schematically by vehicle path indicated at 46A, or alternatively that the driver may turn the vehicle 10 such that it proceeds along an alternate path such as is schematically indicated at 46B, 46C and 46D.

Similarly, the object path boundaries 42 expand over time based on a current characteristic of the object 34 such as speed and position. For each successive future time period, the location of the object 34 is an ever increasing range of possible locations. The rate of the expansion and range of possible locations represents an uncertainty of the position in the future and can change dependent on a classification of the object. From the initial position of the object 32 a predictive model is generated for possible future locations of the object 44 relative to possible vehicle paths 40.

The predictive model of the vehicle path 40 and the predictive model of the object path 42 are combined to identify possible intersecting points that are indicative of a collision. The location of the intersecting point is utilized to identify a potential collision at a future time and to determine a weight for the potential collision.

Given a possible intersecting point at a future time, the weight of that intersecting point is determined by the positional deviation of that point from both the expected vehicle position and the expected object position. The intersecting point with the highest weight is used to determine the collision confidence value, which directly affects the system's strategy for responding to the potential collision. Modifying autonomous braking actions based on a determined collision confidence value enables minimization of intrusion on driver control of the vehicle.

The controller 18 executes an algorithm based on the predictive models of the vehicle path 40 and the object path 42. The algorithm implements the following loop: predict all potential collisions; for each detected collision, determine a confidence that the collision will occur (calculate a corresponding collision confidence value); determine which detected collision will require intervention first (the most relevant collision); and calculate the optimal braking response for the most relevant collision, given the collision weight and time at which it will occur.

Figure 3:
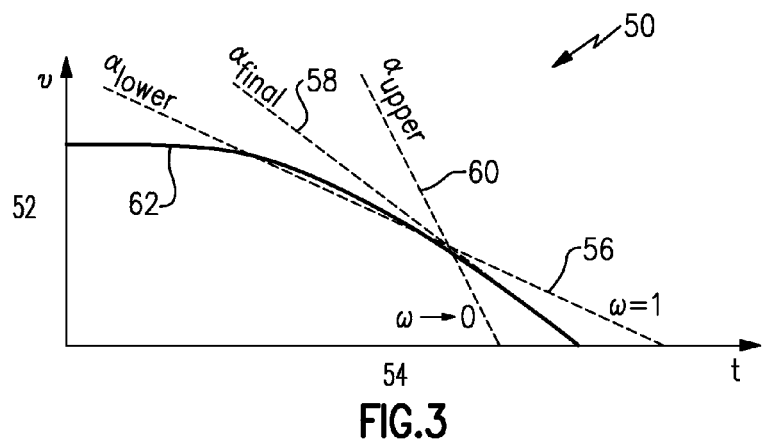
FIG. 3 is a graphical illustration of several velocity curves for a braking maneuver.

Referring to FIG. 3, with continued reference to FIG. 2, graph 50 relates vehicle velocity 52 and time 54 to illustrate vehicle deceleration 62. A collision confidence value is used to directly determine a maximum deceleration value for a maneuver. A lower bound for vehicle deceleration occurs at a high collision confidence value as is shown at 56. The lower bound of vehicle deceleration 56 is gradual over a longer time period. An upper bound for vehicle deceleration occurs at a low collision confidence value as is shown at 60. This type of deceleration is implemented when there is a low probability of collision and therefore the system waits longer to implement a braking maneuver with the expectation that no collision is likely to occur. If the low probability occurrence does occur and a collision condition becomes more probable, a higher braking force will be required resulting in a larger deceleration over a smaller time period.

The upper and lower bounds of deceleration 56, 60 are utilized to define a desired deceleration velocity profile that that in turn determines the braking force to provide the desired deceleration velocity profile indicated at 58. Compensation for the position and confidence level of a collision enables early braking at reduced deceleration rates over a longer time and distance to prevent a collision with a high probability while accepting the slight probability that a more aggressive braking force and vehicle deceleration to stop the vehicle may be required if a determined low probability of collision becomes more probable at a future time. The system anticipates that a steeper more aggressive deceleration may be required for an initial low probability chance of collision that is reflected in the collision confidence value.

Figure 4:
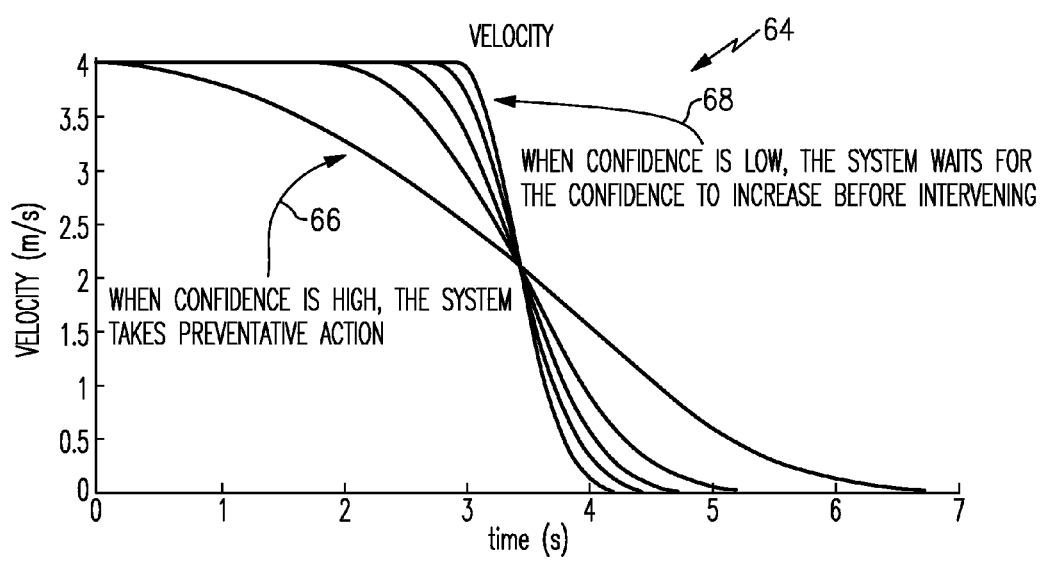
FIG. 4. is a graphical illustration of the effect of collision confidence on velocity curves for a braking maneuver.

Referring to FIG. 4, graph 64 illustrates velocity profiles based on a determined collision confidence value. If the system 12, 14 detects that a collision with an obstacle seems likely one avoidance action may be to use the automatic braking system 12 to apply the brakes 20 to prevent the collision.

Using a numerical value for collision confidence based on the determined weight, the system 12 determines the desired peak deceleration for the braking maneuver. For detected collisions with a low confidence value such as is shown by line 68, the system 12 waits longer to intervene. If the confidence value later changes from low to high, the system 12 is configured to respond with whatever higher braking deceleration is necessary to avoid the collision. However, as is reflected by the collision confidence value, the probability of a collision is low and therefore preventive action will most likely not be required. This strategy also ensures additional time is available for driver reaction.

However, detected collisions with a high confidence value such as that illustrated by line 66 are acted on earlier to lower the maximum deceleration the driver would be subjected to, minimizing intrusion and increasing safety. By braking early, discomfort from sudden intense braking can be minimized. Since intervention may not be necessary in all scenarios, the peak braking deceleration is a function of collision confidence.

Figure 5:
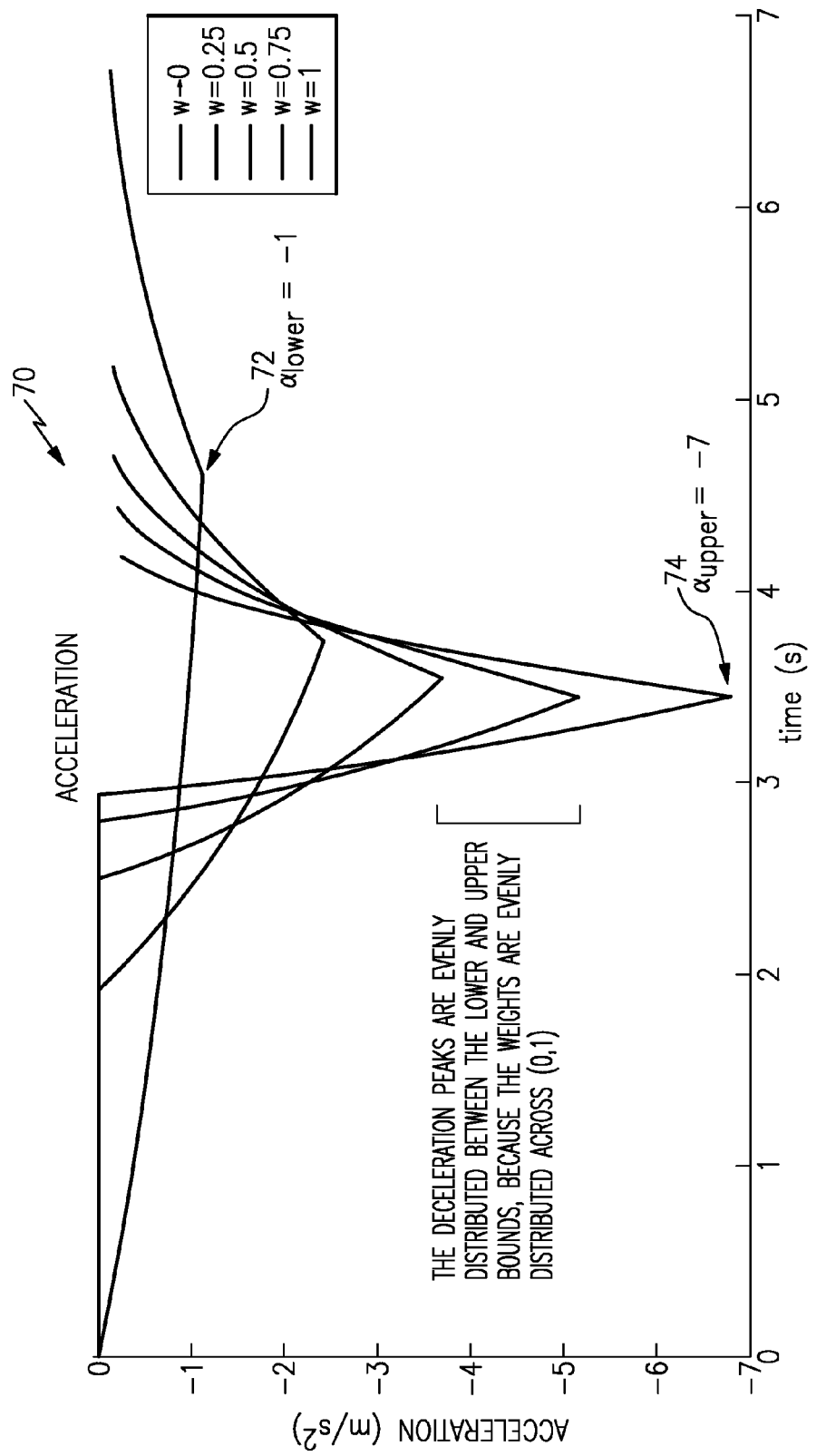
FIG. 5. is a graphical illustration of the effect of collision confidence on deceleration curves for the braking maneuver of FIG. 4.

Referring to FIG. 5, with continued reference to FIG. 4, vehicle acceleration is schematically shown at 70 over a braking maneuver in view of the collision confidence weights. Braking rates are determined based on a collision confidence to minimize intrusion to the driver across a diverse set of braking maneuvers. A high confidence value or weight triggers the system 12 to actuate the brakes earlier and at a lesser force to provide a more gradual deceleration as is shown at 72. Lower confidence levels may not ever result in the requirement that the system intervene to stop the vehicle. Because the probability is low that a collision is possible, the systems waits longer resulting in a required braking force and therefore deceleration that is larger as is shown at 74.

As the collision confidence number changes, due to e.g. vehicle movement, object movement as the car is moving, the desired braking deceleration maneuver and rate may also be changed. The controller 18 continually generates updated predictive models based on movement of the object 34 and the vehicle 10 to enable recalculation of the confidence number over the course of the braking maneuver.

Figure 6:
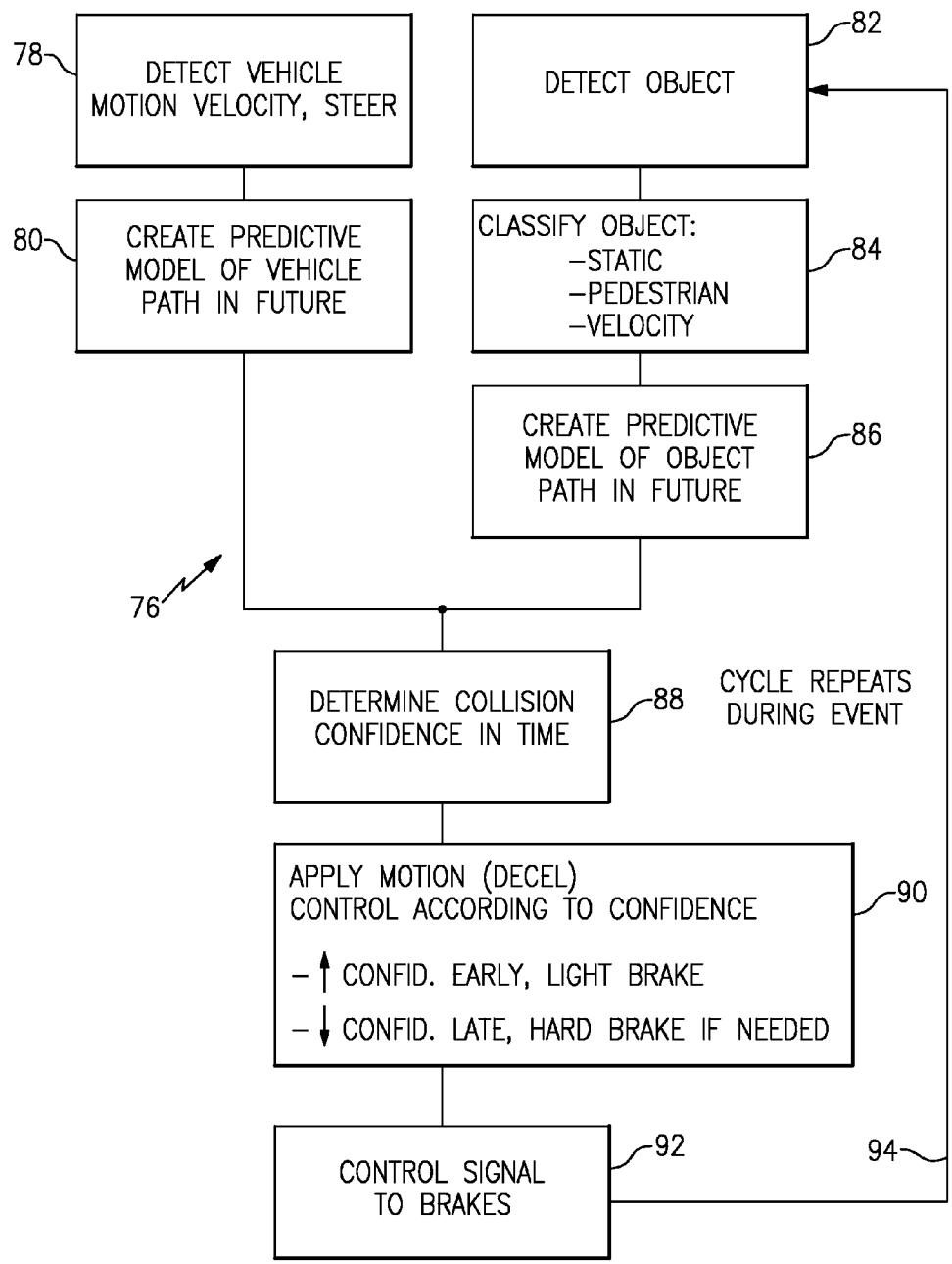
FIG. 6. is a flow diagram schematically illustrating processing steps of the example automatic braking system.

Referring to FIG. 6, with continued reference to FIGS. 1 and 2, the automatic braking system 12 may be used to brake the vehicle 10 when using the reverse collision avoidance system 14. The reverse collision avoidance system 14 includes a camera 30 mounted to provide a view of a rear driving direction for the vehicle 10. The camera 30 may be a monocular camera, binocular camera, or another type of sensing device capable of providing a view of the rear travelling path of the vehicle 10. The camera 30 may be mounted in any location that provides a view of the rear driving path of the vehicle 10. The controller 18 may be connected to the camera 30 to analyze the image/data and identify objects 34 within the image that may be obstacles for the vehicle 10. In addition to the camera 30 the collision avoidance system 14 may use other systems and sensors to assist in identifying objects 34. Such systems and sensors may include, but are not limited to: proximity sensors 36, LIDAR, RADAR, ultrasound, GPS 38, radio sensors, etc.

As soon as the vehicle 10 is started and shifted into reverse, the backup collision avoidance system 14 is started. A warning is provided to a driver when an obstacle is detected and at least one vehicle collision avoidance action is also provided when the probability that the object is determined to be an obstacle exceeds a predetermined threshold.

The example controller 18 includes instructions for detecting an object 34 proximate to the vehicle 10 with at least one of the sensors 36, camera 30 and GPS system 38. The controller 18 further includes instructions for determining a collision confidence number based upon the probability of collision with the object that is generated based on the predictive models. The controller 18 further includes instructions for determining a desired braking force for a braking maneuver such that the braking force is inversely proportional to the determined collision confidence number.

In operation, the backup collision avoidance system 14 operated in one disclosed example embodiment as indicated in flow chart 76 and detects the vehicle motion including velocity, path and steering angle as indicated at 78. The detected parameters are utilized by the controller 18 to generate a predictive model of the vehicle path at a future time and over a defined distance as is indicated at 80. At the same time, the cameras 30, sensors 36 and other detection systems are utilized to detect objects proximate the vehicle 10 as indicated at 82. The objects identified proximate the vehicle are classified as indicated at 84. Classification can include identifying if the object is fixed or moving and if moving at what speed and direction. The information obtained regarding the proximate objects is utilized to generate a predictive model of possible locations of a moving object at some future time as is indicated at 86. The predictive model can account for movement in view of the type of object, such as whether the object is a pedestrian or a person riding a bike. Movement of the pedestrian may also be predicted based on other identifying characteristics, such as whether the pedestrian is an adult or child.

Once the predictive models are generated, they are utilized by the controller 18 to determine a collision confidence number for a specific time as indicated at 88. The collision confidence number in this example is a weight value that provides an indication as to the likelihood of a collision between the vehicle and a detected object based on the predictive models.

If the reverse collision avoidance system 14 detects that a collision with an obstacle seems likely one avoidance action may be to instruct the automatic braking system 12 to apply the brakes 20 as is indicated at 92, to prevent the collision. The braking rate is determined based upon a rate that is inversely proportional to collision confidence as indicated at 90. The controller 18 continually updates the predictive models and thereby updates the collision confidence number as is indicated by return arrow 94. As the collision confidence number changes, due to e.g. vehicle movement, object movement as the car is moving, the desired braking rate may also be changed.

The controller 18 for the reverse collision avoidance system 14 determines the collision confidence number, while a separate controller for the automatic braking system 12 may determine the desired braking rate. Alternatively, the same controller 18 may perform both or either function.

Accordingly, the example backup collision avoidance system 14 utilizes predictive models of both the vehicle path 40 and a detected object path 42 to determine a collision confidence value or weight that is utilized to determine when and how a braking maneuver is performed.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling deceleration of a vehicle comprising:

detecting and monitoring an object proximate to the vehicle with at least one sensor;

monitoring motion of the vehicle;

calculating continuously a plurality of collision confidence values indicative of a probability of a collision between the vehicle and the object based on a corresponding plurality of projected path of the vehicle and the object with a controller located within the vehicle;

determining a velocity profile of the vehicle that avoids a collision between the vehicle and the object for each of the plurality of predicted paths of the vehicle and the object with the controller based on the corresponding one of the plurality of collision confidence values;

defining a deceleration maneuver for each of the plurality of predicted paths of the vehicle and the object over a distance between the vehicle and a determined collision location, wherein a peak deceleration for each of the deceleration maneuvers is inversely proportional to the corresponding collision confidence value to define a lowest vehicle deceleration over the distance that brings the vehicle to a stop prior to the collision location; and generating a signal for instructing application of vehicle brakes with an automatic braking system over the course of the deceleration maneuver according to the velocity profile determined by the controller.

2. The method as recited in claim 1, wherein the velocity profile is determined based on a current collision confidence value such that as the collision confidence value increases indicating a greater probability of a collision, the velocity profile is determined to define the deceleration maneuver of the vehicle that begins at a distance further away from the object as compared to a velocity profile determined on a current collision confidence value indicating a lesser probability of collision.

3. The method as recited in claim 2, including applying vehicle brakes with the automatic braking system over the course of the deceleration maneuver according to the velocity profile determined by the controller.

4. The method of claim 3, wherein applying the vehicle brakes with the automatic braking system further includes sending instructions to an electronic brake system to apply the vehicle brakes.

5. The method as recited in claim 1, analyzing data from the sensors with a controller to determine characteristics of the detected object and if the object is an obstacle for the vehicle to avoid.

6. The method as recited in claim 5, including generating a predictive model of motion of the object that includes a range of possible locations of the object at a future time with associated values of probability based on current position and motion of the object.

7. The method as recited in claim 5, wherein the predictive model utilizes the current position and motion of the object to classify the object as one of an inanimate object and a pedestrian.

8. The method as recited in claim 6, including generating a predictive model of the vehicle to determine vehicle trajectory by monitoring vehicle signals indicative of motion of the vehicle, wherein the predictive model of the vehicle determines a range of possible paths of the vehicle with associated values of probability and relates the predictive model of the vehicle to the predictive model of motion of the object to determine the probability of collision between the vehicle and the object.

9. The method as recited in claim 2, further comprising:
recalculating the collision confidence value during the deceleration maneuver as the probability of collision with the object changes;
determining a new desired velocity profile based on the recalculated collision confidence value; and
applying vehicle brakes according to the new velocity profile.

10. The method as recited in claim 2, including applying a braking force sooner, at a lower deceleration value, and over a longer time interval as the collision confidence value increases based on a predefined set of braking curves selected based on the collision confidence value.

11. The method as recited in claim 2, including applying a braking force later, at a higher deceleration value, and over a smaller time interval as the collision confidence value decreases based on a predefined set of braking curves selected based on the collision confidence value.

12. The method as recited in claim 1, further comprising controlling the vehicle steering and braking systems with a reverse collision avoidance system.

13. A method of avoiding a collision while operating a vehicle in reverse comprising:
monitoring vehicle motion;
detecting an object proximate to the vehicle with at least one sensor of a reverse collision avoidance system;
determining a plurality of collision confidence values indicative of a probability of collision between the vehicle and the detected object for each of a corresponding plurality of predicted paths of the vehicle and the object with a controller located within the vehicle;
determining a desired velocity profile for a deceleration maneuver of the vehicle with a controller for each of the plurality of predicted paths of the vehicle and the object based on the corresponding determined collision confidence value, such that deceleration of the vehicle is inversely proportional to the collision confidence value;
generating a control signal configured for instructing the application of vehicle brakes with an automatic braking system over the course of the deceleration maneuver according to the velocity profile determined by the controller corresponding to the highest collision confidence value.

14. The method as recited in claim 13, including applying a braking force sooner, at a lower deceleration, over a longer time interval as the collision confidence value increases based on a predefined set of velocity profile selected based on the collision confidence value.

15. The method as recited in claim 13, including applying a braking force later, at a higher deceleration value, over a smaller time interval as the collision confidence value decreases based on a predefined set of velocity profiles selected based on the collision confidence value.

16. The method as recited in claim 13, including applying vehicle brakes responsive to the control signal with the automatic braking system over the course of the deceleration maneuver according to the velocity profile determined by the controller.

17. The method as recited in claim 13, including analyzing data from at least one sensor with a controller to determine if the detected object is an obstacle for the vehicle.

18. The method as recited in claim 17, including generating a predictive model of the object that includes a range of possible locations of the object at a future time based on a current position and motion of the object and generating a predictive model of the vehicle that includes a range of possible paths of the vehicle and relating the predictive model of the vehicle to the predictive model of the object to determine the probability of collision between the vehicle and the object.

19. The method as recited in claim 13, further comprising:
recalculating the collision confidence value over the course of the deceleration maneuver as the probability of collision with the obstacle changes;
determining a new desired velocity profile for deceleration of the vehicle based on the recalculated collision confidence value; and
applying vehicle brakes according to the new desired velocity profile.

20. The method as recited in claim 13, further comprising providing a warning to the driver when the object is detected in the path of the vehicle prior to applying the vehicle brakes.

21. An automatic braking system for a vehicle comprising:
an electronic brake system capable of applying wheel brakes to decelerate the vehicle; and
a controller disposed within the vehicle generating instructions for:
monitoring vehicle motion;
detecting an object proximate to the vehicle with at least one sensor of a reverse collision avoidance system;
calculating a collision confidence value indicative of a probability of a collision between the vehicle and the object for each of a corresponding plurality of predicted paths of the vehicle and the object; and
determining a desired velocity profile of the vehicle that avoids a collision between the vehicle and the object with the controller for each of the predicted paths of the vehicle and the object based on the calculated collision confidence value, wherein a braking force for each of the desired velocity profiles is inversely proportional to the corresponding calculated collision confidence value.

22. The automatic braking system for a vehicle as recited in claim 21, wherein the controller includes instructions for determining the velocity profile such that deceleration of the vehicle is inversely proportional to the collision confidence value.

23. The automatic braking system as recited in claim 21, wherein the controller further includes instructions for applying a braking force sooner, at a lower deceleration value, over a longer time interval as the collision confidence value increases according to a predefined set of velocity profiles selected based on the collision confidence value.

24. The automatic braking system as recited in claim 21, wherein the controller further includes instructions for applying a braking force later, at a higher deceleration value, over a smaller time interval as the collision confidence value decreases according to a predefined set of velocity profiles selected based on the collision confidence value.

25. The automatic braking system as recited in claim 21, wherein the controller further includes instructions for applying vehicle brakes over the course of the deceleration maneuver according to the desired velocity profile determined by the controller.

26. The automatic braking system as recited in claim 21, wherein the controller includes instructions for generating a predictive model of the object that includes a range of possible locations of the object at a future time based on a current position and motion of the object and generating a predictive model of the vehicle that includes a range of possible paths for the vehicle and relating the predictive model of the vehicle to the predictive model of the object to determine the probability of collision between the vehicle and the object.

27. The automatic braking system as recited in claim 22, wherein the controller includes further instructions for:
   recalculating the collision confidence value over the course of the vehicle deceleration as the probability of collision with the object changes;
   determining a new desired velocity profile based on the recalculated collision confidence number; and
   applying vehicle brakes according to the new desired velocity profile.

28. The automatic braking system as recited in claim 21, wherein the controller further includes instructions for providing a warning to the driver when the object is detected in the path of the vehicle prior to applying vehicle brakes.

* * * * *